United States Patent [19]

Cho

[11] Patent Number: 5,609,022
[45] Date of Patent: Mar. 11, 1997

[54] METHOD OF REDUCING $NO_x$ EMISSIONS FROM LEAN-BURN COMBUSTION ENGINES

[75] Inventor: Byong K. Cho, Rochester Hills, Mich.

[73] Assignee: General Motors Corporation, Detroit, Mich.

[21] Appl. No.: 331,410

[22] Filed: Oct. 31, 1994

[51] Int. Cl.$^6$ .................................................... F01N 3/20
[52] U.S. Cl. .................................. 60/274; 60/286; 60/301
[58] Field of Search .............................. 60/274, 286, 303, 60/284, 301

[56] References Cited

U.S. PATENT DOCUMENTS

| | | | |
|---|---|---|---|
| 5,201,802 | 4/1993 | Hirota | 60/301 |
| 5,365,733 | 11/1994 | Takeshima | 60/301 |
| 5,365,734 | 11/1994 | Takeshima | 60/286 |

OTHER PUBLICATIONS

Ward's Engine and Vehicle Technology, vol. 20, No. 13/Jul. 1, 1994; "VW: diesel returns to U.S. in '95", p. 4.

C.J. Bennett et al, "Selective reduction of nitrogen oxides under oxidising exhaust–gas conditions", Applied Catalysis A: General, 86 (1992) L1–L6.

M. Konno et al, "Catalytic Reduction of NOx in Actual Diesel Engine Exhaust", SAE Paper No. 920091.

B.H. Engler et al, "Catalytic Reduction of NOx with Hydrocarbons Under Lean Diesel Exhaust Gas Conditions", SAE Paper No. 930735.

Primary Examiner—Douglas Hart
Attorney, Agent, or Firm—Cary W. Brooks

[57] ABSTRACT

The invention includes an operating strategy for zeolite-based catalysts used for reduction of $NO_x$ from highly lean exhaust conditions. The invention includes a method to enhance the high temperature activity of zeolite-based catalysts by modifying the transient feed composition without changing the overall time-average feed composition. More specifically, a cyclic operation method with alternating feed conditions between rich and lean to enhance the activity of zeolite-based catalysts to remove NO from lean exhaust gases when the overall exhaust composition contains a large amount of excess oxygen, without affecting the catalyst's activity to remove hydrocarbons. The rich to lean transient conditions are created by periodically adding hydrocarbon pulses from a different source to the combustion emissions.

7 Claims, 1 Drawing Sheet

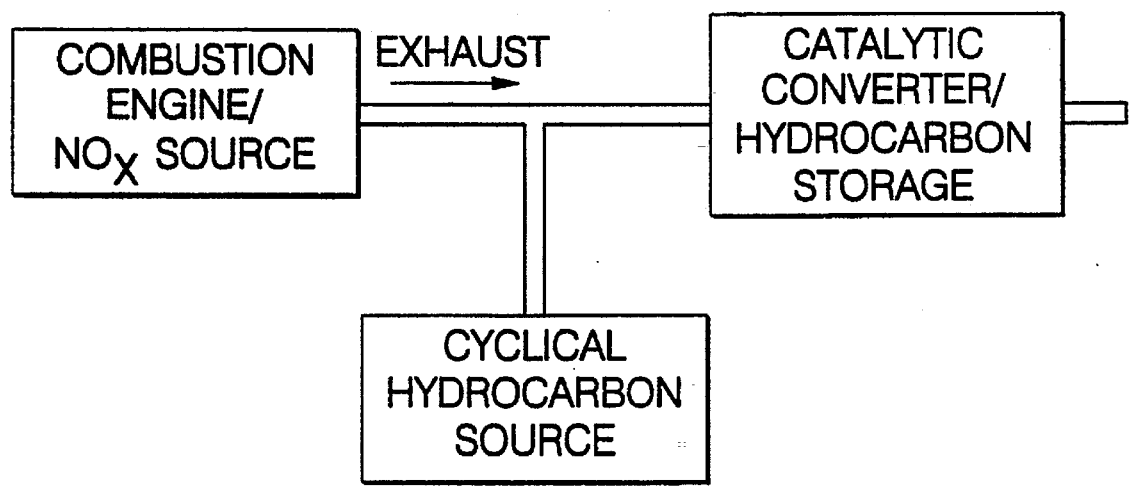

METHOD OF REDUCING $NO_x$ EMISSIONS FROM LEAN-BURN COMBUSTION ENGINES

FIELD OF THE INVENTION

This invention relates to methods of controlling combustion engine emissions, and more particularly to a method of reducing $NO_x$ and emissions from a lean-burn combustion engine.

BACKGROUND OF THE INVENTION

Diesel and lean-burn gasoline engines generally operate under highly oxidizing conditions (i.e., using much more than is necessary to burn the fuel), typically at air/fuel ratios greater than 17, and usually about 20 to 23. Under these highly lean conditions, typical three-way catalysts (for converting hydrocarbons, $NO_x$ and CO containing primarily noble metals such as Pt, Pd, and Rh supported on Y-alumina exhibit little activity toward $NO_x$ reduction, as their reduction activity is suppressed by the presence of excess oxygen. Recently, copper-ion exchanged zeolite catalysts, especially Cu-ZSM-5 catalysts among others, have been shown to be active for selective reduction of $NO_x$ by hydrocarbons in the presence of excess oxygen. Platinum-ion exchanged zeolite catalyst, such as Pt-ZSM-5 is also known to be active for $NO_x$ reduction by hydrocarbons under lean conditions. However, this catalytic activity is significant only in a narrow temperature range around the lightoff temperature of hydrocarbon oxidation. All the known lean-$NO_x$ catalysts reported in the literature tend to lose their catalytic activity for $NO_x$ reduction when the catalyst temperature reaches well above the lightoff temperature of hydrocarbon oxidation. This narrow temperature window of the lean-$NO_x$ catalysts is considered to be one of the major technical obstacles, because it makes practical application of these catalysts difficult for lean-burn gasoline or diesel engines.

The present invention overcomes many of the shortcomings of the prior art.

SUMMARY OF THE INVENTION

The invention includes an operating strategy for zeolite-based catalysts used for reduction of $NO_x$ from highly lean exhaust conditions such as from both diesel and gasoline engines. The invention includes a method to enhance the high temperature activity of zeolite-based catalysts by modifying the transient composition of feed to the reactor without changing the overall time-average feed composition. More specifically, a cyclic operation method is used with alternating feed conditions between rich and lean to enhance the activity of zeolite-based catalysts to remove $NO_x$ from lean exhaust gases. The rich to lean transient conditions are created by periodically introducing hydrocarbon pulses to the reactor from a source different than the combustion emissions. The hydrocarbon may also be added at a constant rate.

These and other objects, features and advantages of the present invention will become apparent from the following brief description of the drawings, detailed description and appended claims.

BRIEF DESCRIPTION OF THE DRAWING

The single drawing FIGURE is a schematic illustration of the present invention.

DETAILED DESCRIPTION

To make the lean-$NO_x$ catalysts such as Cu-ZSM-5 and Pt-ZSM-5 practicable to the real emission control application, it is therefore important to improve the overall catalytic activity of those catalysts. One way to achieve this is to widen the effective temperature window of the catalysts by improving the catalytic activity at high temperatures above the lightoff temperature of hydrocarbon oxidation. A method of expanding the temperature window of the lean-$NO_x$ catalysts for $NO_x$ reduction activity can be identified by thorough understanding of the unique reaction dynamics of $NO_x$ reduction by hydrocarbons in the presence of excess oxygen, which is characteristic of the zeolite-based lean-$NO_x$ catalysts. During our recent investigation of the transient reaction dynamics of the lean-$NO_x$ catalysts, we have made two discoveries of practical importance. One is that the zeolite-based lean-$NO_x$ catalysts can store substantial amounts of hydrocarbons even at high temperatures up to around 500° C., and the other is that the maximum catalytic activity for $NO_x$ reduction can be achieved during the transition between rich and lean conditions. These two discoveries are the key concepts employed in this invention to improve the overall performance of the lean-$NO_x$ catalysts. This invention is concerned with an operating strategy of lean-$NO_x$ catalysts, by which the activity of lean-$NO_x$ catalysts can be improved and the temperature window of the catalysts for $NO_x$ reduction can be widened.

More specifically, it has been discovered that an appropriate cyclic operation of the lean-$NO_x$ catalysts can markedly improve the overall performance of the catalysts for $NO_x$ reduction under highly lean conditions at temperatures above the reaction lightoff temperature.

Under steady-state operating conditions, the temperature range where the $NO_x$ reduction activity of the lean-$NO_x$ catalysts can be well utilized is confined to a narrow temperature window around the lightoff temperature of hydrocarbon oxidation. Above this temperature, the conversion of hydrocarbons reaches near completion. As temperature rises above the lightoff temperature of hydrocarbon oxidation, the catalysts gradually loses their catalytic activity due to the lack of hydrocarbons which can prevent the active catalytic sites from being poisoned by the excess oxygen.

Under cyclic operating conditions between rich and lean conditions, on the other hand, the zeolite-based lean-$NO_x$ catalysts can store hydrocarbons during the rich half-cycle and release them during the subsequent lean half-cycle. By this periodic cycling operation, deactivation of the catalysts due to the excess oxygen can effectively be prevent from occurring. Consequently, the temperature window of the catalysts under the cyclic operating condition becomes much wider than that under the steady-state operating condition. This results in a significant improvement in the overall performance of the lean-$NO_x$ catalysts. Experimental demonstrations of this concept are presented below.

In order to compare the effectiveness of cyclic operation of our invention with that of conventional steady state operations, we carried out a series of reactor experiments using both Cu-ZSM-5 and Pt-ZSM-5 catalysts. Details of experimental conditions are listed in Table 1.

TABLE 1

Standard Experimental Conditions

| | |
|---|---|
| Cu-ZSM-5 Catalyst: | Si/Al ratio = 32 |
| | Cu loading = 2.4 wt % |
| Pt-ZSM-5 Catalyst: | Si/Al ratio = 40 |
| | Pt loading = 0.5% |
| Reactor: | 0.32 cm o.d. stainless steel tubing |
| | Catalyst particle size = 80–120 mesh |
| | Sample weight = 0.015 g |
| | Catalyst bed length = 1 cm |
| | Total gas flow rate = 50 cm$^3$/m (STP) |
| | Gas space velocity = 86,000/h |
| | Temperature = 200–600° C. |
| | Pressure = 101.3 kPa (1 atm) |
| Feed Concentration: | $C_2H_4$ = 1200 ppm |
| | NO = 230 ppm |
| | $O_2$ = 7% |
| | He = balance |

ZSM-5 zeolite powder samples in the size range of approximately 0.5–1 μm were obtained from PQ Corporation, which had high Si/Al ratios of approximately 32 and 40. The Cu-ZSM-5 and Pt-ZSM-5 catalysts were prepared by ion exchange of copper and Pt on the ZSM-5 zeolite to obtain a copper loading of 2.4 weight percent and Pt loading of 0.5 weight percent, respectively. The ion-exchanged ZSM-5 samples were dried overnight in air at room temperature, heated slowly in flowing air up to 500° C., and then calcined in air at 500° C. for four hours. The Cu-ZSM-5 and Pt-ZSM-5 powder samples were made into disks by compressing at 10 ton pressure. The resulting sample disks were crushed, ground, and screened for 80–120 mesh sizes to be used for reactor experiments.

A fixed-bed reactor was prepared using a 3.2 mm O.D. stainless steel tube. The depth of the catalyst bed in the tube was 1 cm. The reactor was placed in a 30 cm long tubular furnace, and the reactor temperature was measured at the inlet of the catalyst bed and controlled electronically with a typical precision of ±1° C. Before each experimental run for activity measurement, the reactor containing the catalyst particles was flushed with 7 volume percent oxygen in helium at 600° C. for two hours to burn off any carbonaceous deposits on the catalytic surface. The reactor temperature was then reduced to the desired operating temperatures. The apparatus was designed in such a way that both steady-state experiments and transient cycling experiments could be performed. The total gas flow rate was 50 cm$^3$/minute at 101 kPa. The transient responses of the gas-phase concentration in the exit stream from the reactor were monitored as a function of time by a mass spectrometer.

The catalytic activity of both Cu-ZSM-5 and Pt-ZSM-5 catalysts under steady-state operating conditions was compared with that under cyclic operating conditions, with the time-average feed composition being kept constant. Under the steady-state operating conditions, the standard reaction mixture (i.e., NO+$C_2H_4$+$O_2$) was steadily fed to the reactor. Under the cyclic operating conditions, a pulse of 20 second duration containing $C_2H_4$+NO+Ar (rich half-cycle) was introduced to the reactor, followed by an oxygen pulse of the same duration (lean half-cycle). This rich/lean cycling process was repeated until the system was stabilized. The feed concentrations of NO, ethylene and oxygen were 230 ppm, 1200 ppm and 7 percent, respectively, for both the steady-state and the cyclic operating conditions. Note that the overall time-average feed composition remained in the highly lean condition for both the steady-state and the cyclic operating conditions. Argon was used as an inert reference gas to help identify the half-cycle that contained NO and ethylene in the feed. The conversion of NO was measured by a mass spectrometer.

Results shown in Table 2 are time-average conversion of NO to nitrogen over Cu-ZSM-5 catalyst at three different temperatures above the lightoff temperature of $C_2H_4$ oxidation which was found to be 325° C. They clearly indicate that the activity of the Cu-ZSM-5 catalyst for nitric oxide reduction can be enhanced by operating the catalyst in a cyclic mode instead of the traditional steady-state mode. The conversion of $C_2H_4$ remained the same under both operating conditions.

TABLE 2

Performance of Cu-ZSM-5 Catalyst

| | Conversion of NO to $N_2$ | |
|---|---|---|
| Temperature | Steady Operation | Cyclic Operation |
| 350° C. | 68.3% | 72.0% |
| 400° C. | 49.0% | 76.2% |
| 500° C. | 23.6% | 92.6% |

The same trend was observed for the Pt-ZSM-5 catalyst as shown in Table 3, without affecting the conversion of $C_2H_4$. The reaction lightoff temperature of $C_2H_4$ oxidation was found to be 215° for Pt-Z;SM-5, much lower than that for Cu-ZSM-5.

TABLE 3

Performance of Pt-ZSM-5 Catalyst

| | Conversion of NO to $N_2$ | |
|---|---|---|
| Temperature | Steady Operation | Cyclic Operation |
| 300° C. | 37.3% | 64.1% |
| 500° C. | 2.4% | 72.1% |

Effects of hydrocarbon addition to the standard feed mixture on the $NO_x$ conversion efficiency of lean-$NO_x$ catalysts were examined by introducing additional $C_2H_4$ to the standard feed stream either in a steady-addition mode or in a cyclic-addition mode. Results are shown in Table 4 and 5.

TABLE 4

Effect of $C_2H_4$ Addition on Performance of Cu-ZSM-5 Catalyst

| | Conversion of NO to $N_2$ | |
|---|---|---|
| Mode of $C_2H_4$ Addition | 375° C. | 500° C. |
| No Addition | 64.1% | 23.6% |
| Steady Addition | 71.9% | 26.5% |
| Cyclic Addition | 84.4% | 31.2% |

TABLE 5

Effect of $C_2H_4$ Addition on Performance of Pt-ZSM-5 Catalyst

| Mode of $C_2H_4$ Addition | Conversion of NO to $N_2$ at 500° C. |
|---|---|
| No addition | 2.4% |
| Steady Addition | 9.2% |
| Cyclic Addition | 15.7% |

In the no-addition mode (Table 4 and 5), the standard feed mixture was composed of 230 ppm $NO_x$, 1200 ppm $C_2H_4$ and 7 percent $O_2$, as shown in Table 1. In the steady-addition mode, a steady flow of $C_2H_4$ (5000 ppm in He) was introduced at a rate of 5 cc/minute to the standard feed mixture. In the cyclic-addition mode, a pulse of $C_2H_4$ (5000 ppm in He) was introduced for a duration of 10 seconds at a rate of 10 cc/minute, followed by the flow of the standard feed mixture for the next 10 seconds by cutting off the additional $C_2H_4$ flow. This cyclic addition of $C_2H_4$ was repeated until the reaction system was stabilized. Note that the time-average amount of $C_2H_4$ added to the standard feed stream is the same for the steady-addition and the cyclic-addition mode. Results for the Cu-ZSM-5 catalyst presented in Table 4 led us to two important findings. First, the catalytic activity of Cu-ZSM-5 above the reaction lightoff temperature can be improved by addition of hydrocarbons, particularly $C_2H_4$. Second, cyclic addition of $C_2H_4$ is more effective for NO reduction than steady addition for the same amount of $C_2H_4$ addition. In all cases, the conversion of $C_2H_4$ remained constant at 100% conversion. The same trend was observed for the Pt-ZSM-5 catalyst, as shown in Table 5.

The active catalytic metal ingredients can be Pt, Rh, Pd, Cu, Ni, Co, Cr, Fe, Mn, rare earth metals, etc., while the catalyst support can be various types of zeolites such as ZSM-5, mordenite, zeolite, etc., depending on the type of hydrocarbons available in the reaction system.

The hydrocarbons useful in the cyclic process of the present invention can be $C_2H_4$, $C_3H_6$, $C_3H_8$, $C_4H_{10}$, $CH_4$, etc., depending on the type of the active catalytic ingredients and the operating conditions. The cyclic addition of hydrocarbon pulses to the standard feed stream achieves maximum enhancement of the catalytic activity. The pulse duration can be varied for the optimum performance, preferably in the range of 1 second through 60 seconds. Pressure of the additional hydrocarbon pulses can be in a slight positive pressure with respect to the standard feed pressure, preferably in the range of 0.1 to 10 psi. A lean burn gasoline engine may be operated at 17 to 20 to 23 air/fuel ratios. A diesel engine may be operated at an air/fuel ratio ranging from 35 to 45.

The embodiments of the invention in which an exclusive property or privilege is claimed is defined as follows:

1. A method comprising:

operating a combustion engine in a lean half cycle having an air/fuel ratio greater than 17, collecting the exhaust including $NO_x$ from the combustion engine in an exhaust system and steadily feeding a stream of exhaust to a reactor including a zeolite-based material having a catalyst thereon;

operating the catalyst in a rich half cycle by periodically adding hydrocarbon pulses from a source other than the combustion engine to the steady stream of exhaust in the exhaust system prior to the exhaust flowing over the catalyst, and wherein said catalyst has an operating temperature ranging from light-off temperature to about 500° C., so that hydrocarbons are stored in the catalyst during the rich half cycle and thereafter released during the lean half cycle to improve reduction of $NO_x$ in the exhaust.

2. A method as set forth in claim 1 wherein said catalyst comprises copper.

3. A method as set forth in claim 1 wherein said catalyst comprises platinum.

4. A method as set forth in claim 1 wherein said catalyst comprises a noble metal.

5. A method as set forth in claim 1 wherein said catalyst is deposited on said zeolite-based material by ion-exchange.

6. A method as set forth in claim 1 further comprising operating the combustion engine is a gasoline engine at an air/fuel ratio of greater than 17 to about 23 during the lean half cycle.

7. A method as set forth in claim 1 wherein said combustion engine is a diesel engine and further comprising operating the engine at the air/fuel ratio of 35 to 45 during the lean half cycle.

* * * * *